US010754990B2

(12) United States Patent
Ishihara et al.

(10) Patent No.: US 10,754,990 B2
(45) Date of Patent: Aug. 25, 2020

(54) ELECTRONIC DEVICE

(71) Applicants: YOKOGAWA ELECTRIC CORPORATION, Musashino-shi, Tokyo (JP); YOKOGAWA METERS & INSTRUMENTS CORPORATION, Musashino-shi, Tokyo (JP)

(72) Inventors: Gentaro Ishihara, Musashino (JP); Tohru Mori, Musashino (JP)

(73) Assignees: Yokogawa Electric Corporation, Tokyo (JP); YOKOGAWA TEST & MEASUREMENT CORPORATION, Tokyo (JP)

( * ) Notice: Subject to any disclaimer, the term of this patent is extended or adjusted under 35 U.S.C. 154(b) by 173 days.

(21) Appl. No.: 15/266,501

(22) Filed: Sep. 15, 2016

(65) Prior Publication Data

US 2017/0076115 A1 Mar. 16, 2017

(30) Foreign Application Priority Data

Sep. 16, 2015 (JP) .................................. 2015-182617

(51) Int. Cl.
*G01J 3/46* (2006.01)
*G06F 21/70* (2013.01)
(Continued)

(52) U.S. Cl.
CPC ............ *G06F 21/70* (2013.01); *G01J 1/0228* (2013.01); *G01J 3/027* (2013.01); *G06F 3/0489* (2013.01); *G06F 21/31* (2013.01)

(58) Field of Classification Search
None
See application file for complete search history.

(56) References Cited

U.S. PATENT DOCUMENTS 4,968,140 A 11/1990 Berner et al.
7,420,544 B2 * 9/2008 Ono ..................... G06F 3/0489
345/172
(Continued)

FOREIGN PATENT DOCUMENTS

JP 2-264819 A 10/1990
JP 3-104815 U 10/1991
(Continued)

OTHER PUBLICATIONS

AQ6370 Viewer. Yokogawa. Waybackmachine. Aug. 10, 2014. (Year: 2014).*

(Continued)

*Primary Examiner* — Venkat Perungavoor
(74) *Attorney, Agent, or Firm* — Sughrue Mion, PLLC

(57) ABSTRACT

A measurement device is provided. The measurement device includes a display, a detector, an operation unit, and a central processing unit. The detector detects a physical quantity and outputs measurement data based on the detected physical quantity. The operation unit includes plural keys for performing operation functions for operating the measurement device to detect and output the measurement data. The central processing unit controls the display to display the measurement data on the display, and to lock the operation unit such that all of the operation functions are temporarily inoperable except for an unlocking function and one or more of the operation functions that is set to be selectively operable even when the operation unit is locked.

7 Claims, 9 Drawing Sheets

(51) Int. Cl.
*G01J 3/02* (2006.01)
*G01J 1/02* (2006.01)
*G06F 3/0489* (2013.01)
*G06F 21/31* (2013.01)
*G06F 21/82* (2013.01)

(56) References Cited

U.S. PATENT DOCUMENTS

| | | | | |
|---|---|---|---|---|
| 9,027,117 | B2* | 5/2015 | Wilairat | G06F 21/36 726/17 |
| 9,606,643 | B2* | 3/2017 | Aguera-Arcas | G06F 3/03547 |
| 2004/0243260 | A1* | 12/2004 | Law | G06Q 10/10 700/86 |
| 2007/0011461 | A1* | 1/2007 | Jeng | H04M 1/66 713/183 |
| 2008/0020803 | A1* | 1/2008 | Rios | H04M 1/667 455/565 |
| 2010/0083302 | A1* | 4/2010 | Oka | H04N 5/4403 725/28 |
| 2010/0219327 | A1* | 9/2010 | Arbore | G01N 21/55 250/206 |
| 2010/0287490 | A1 | 11/2010 | Ichimi | |
| 2012/0129496 | A1 | 5/2012 | Park et al. | |
| 2013/0029731 | A1* | 1/2013 | Fuchigami | H04M 1/72577 455/566 |
| 2013/0246904 | A1* | 9/2013 | Seliger | G06F 3/0481 715/234 |
| 2015/0212314 | A1 | 7/2015 | Kuri et al. | |
| 2017/0090623 | A1* | 3/2017 | Masaki | G06F 3/044 |

FOREIGN PATENT DOCUMENTS

| | | |
|---|---|---|
| JP | 767497 A | 3/1995 |
| JP | 8-136398 A | 5/1996 |
| JP | 10-314174 A | 12/1998 |
| JP | 2006-40408 A | 2/2006 |

OTHER PUBLICATIONS

A systematic security evaluation of android's multi-user framework. Ratazzi et al. (Year: 2014).*
Optical Spectrum Analyzer. Apex Technologies. Wayback machine. Sep. 6, 2013. (Year: 2013).*
Communication dated Feb. 22, 2017 issued by the European Patent Office in counterpart European Patent Application No. 16188315.2.
Office Action dated Jun. 18, 2020 by the European Patent Office in counterpart European Patent Application No. 16188315.2.

\* cited by examiner

ELECTRONIC DEVICE

CROSS-REFERENCE TO RELATED APPLICATION

The present application claims priority from Japanese Patent Application No. 2015-182617 filed on Sep. 16, 2015, the entire content of which is incorporated herein by reference.

BACKGROUND

Technical Field

The present disclosure relates to an electronic device, and more particularly, to an improvement in a lock function of locking an operation unit of an electronic device if necessary such that it is temporarily impossible to operate the operation unit.

Related Art

As one type of electronic device, there are measurement devices which are configured to measure physical quantities which are objects to be measured and display the measurement results of the physical quantities for users and which include light-spectrum electronic devices such as an optical spectrum analyzer or a light wavelength meter for measuring and displaying spectrum information of light which is an object to be measured, and a light pulse tester (OTDR) for measuring and displaying loss distribution information in the longitudinal direction of a fiber which is an object to be measured.

These measurement devices have input devices usable for users to perform various operations such as operations for setting various measurement conditions, operations for performing or interrupting a measuring operation, and an operation for performing a process of analyzing measurement results, such as a key operation unit having an array of a plurality of mechanical operation keys on an operation panel, or a touch panel which displays an array of a plurality of electronic operation keys on its display screen.

Also, the measurement devices have output devices, such as a liquid crystal display (LCD), for displaying (outputting) the statuses of settings of various measurement conditions, various set measurement conditions, the status of performance of a measuring operation, measurement results, and the like for users.

Further, some of the measurement devices have a lock function as a function of preventing a device from being operated by people other than a user when the user is temporarily away from the measurement device or preventing an erroneous operation such as an operation of erroneously stopping measurement in the middle of the measurement. This lock function means a function usable for a user to lock an operation state such that it is temporarily impossible to operate a device.

A user of a measurement device which is configured as described above can measure characteristics which are objects to be measured by operating an input device, and can obtain a variety of information, such as the status of an operation of the measurement device and measurement results, from the display screen of an output device.

FIG. 8 is a configuration block diagram illustrating an example of a light spectrum measurement device of the related art. Referring to FIG. 8, if light to be measured such as laser light enters a spectroscope 101, for example, through an optical fiber, the spectroscope disperses the light, and extracts light of a desired wavelength component from the light to be measured, and outputs the extracted light.

A light detector 102 is disposed such that its light receiving surface faces the spectroscope 101, and receives the light output from the spectroscope 101, and converts the received light into an electric signal (an analog signal), and outputs the electric signal. As the light detector 102, for example, a photodiode can be used.

An amplifier 103 amplifies the electric signal output from the light detector 102, and outputs the amplified electric signal.

An A/D converter 104 converts the electric signal amplified by the amplifier 103, into a digital signal, and outputs the digital signal as measurement data to a bus B connected to a CPU 107.

A storage unit 105 is composed of a hard disc, a random access memory (RAM), a read only memory (ROM), or the like, and is electrically connected to the CPU 107 through the bus B. The storage unit 105 stores programs to be executed by the CPU 107, such as a control program and a signal processing program, in advance, and temporarily stores various parameters such as measurement conditions and arithmetic operation conditions, and performs input/output of a variety of information in response to control of the CPU 107.

An operation unit 106 is configured to have various operation buttons such as function keys and numeric keys, and output user's operation instructions, and is electrically connected to the CPU 107 through the bus B.

The CPU 107 is electrically connected to the spectroscope 101, the light detector 102, the amplifier 103, the A/D converter 104, the storage unit 105, the operation unit 106, and a display unit 108 through the bus B, and acquires spectrum data by performing predetermined arithmetic processes, such as spectrum data correction, on the measurement data on the basis of the above-mentioned signal processing program while controlling each of those units on the basis of the above-mentioned control program, and displays the spectrum data on the display unit 108.

The display unit 108 is configured to visualize and output the above-mentioned spectrum data, and is electrically connected to the CPU 107 through the bus B. The display unit 108 is composed of, for example, a liquid crystal display (LCD), a cathode ray tube (CRT), or the like.

FIG. 9 is a view illustrating an example of the configuration of a front panel of the light spectrum measurement device which is configured as shown in FIG. 8.

A front panel 201 has the operation unit 106 configured as an input device usable for a user to perform various operation inputs, and the display unit 108 configured to visualize a variety of information, such as set measurement conditions, the status of an operation, and measurement results, and display (output) the visual information.

The operation unit 106 includes various operation buttons of function keys 202, numeric keys 203, a lock operation key 204, and a software key part 205.

The function keys 202 are composed of a plurality of keys usable for a user to input operations for instructing desired functions. Some keys of the function keys 202 each cause a corresponding function to be immediately executed if it is pressed, and the other keys of the function keys 202 each cause a plurality of associated functions to be displayed on the software key part 205 if it is pressed.

The software key part 205 is composed of a plurality of software keys 207 which is displayed on the display unit 108, and a plurality of keys 206 for instructing the measurement device to perform the functions of corresponding software keys 207, respectively.

The software keys 207 are configured such that the functions assigned to the individual keys are displayed as the names of the keys on the display unit 108. If the user presses any one function key 202, the names of a plurality of software keys associated with the function of the pressed key are displayed.

For example, if the user presses a "SETUP" key which is one of the function keys 202 and corresponds to a measurement condition setting function, as the names of a plurality of keys associated with a screen display function, "RESOLUTION" which is the name of a key for setting the resolution of measurement, "SENSITIVITY" which is the name of a key for setting the sensitivity of measurement, "AVERAGE" which is the name of a key for setting the number of times of averaging of average measurement, and the like are displayed in a corresponding area of the software key part 205.

In order to perform a function displayed on a software key 207, the user presses a key 206 corresponding to the position of the corresponding software key 207. For example, in order to perform the function of the second software key 207 from the top of the display unit 108, the user presses the second key 206 from the top, as a key corresponding to the software key.

The numeric keys 203 are composed of a plurality of keys, such as numeric keys and an enter key usable for the user to input numerical parameters.

The lock operation key 204 is a key usable for the user to input a locking or unlocking operation. In the example of FIG. 9, the lock operation key 204 is separately provided as a key independent from the function keys 202. However, the lock operation key may be provided as one software key 207.

FIG. 10 is a state transition view of the measurement device of the related art which is configured as shown in FIGS. 8 and 9 and has a lock function, and shows a unlocked state 301 in which it is possible to operate the measurement device, and a lock state 302 in which it is impossible to operate the measurement device.

The unlocked state 301 represents a pre-locking state in which the measurement device is unlocked and allows the user to operate the measurement device through the input device. In the unlocked state 301, it is possible to perform various operations, such as operations of setting measurement conditions, operations for performing or interrupting a measuring operation, and an operation for performing an analyzing process on measurement results.

The lock state 302 represents a state in which the user cannot perform every operation except for an unlocking operation. In the lock state 302, even though the user performs any one of various operations which are possible in the unlocked state 301, the measurement device does not execute a corresponding function. In this case, in order to inform the user that the corresponding operation is invalid in the lock state, the measurement device can emit a beep sound or display a message on the display unit 108.

However, even in the lock state 302, an unlocking operation is processable. If the user performs a predetermined unlocking operation, the measurement device transitions to the unlocked state 301 such that it is possible to operate the measurement device.

The unlocking operation is an operation of inputting an unlocking request of the user to the measurement device, such as pressing of a specific key such as the lock operation key 204, a password inputting operation, or inserting of a hardware key for unlocking.

As described above, the user can switch the measurement device to the lock state 302 by performing a locking operation on the measurement device. In this way, the user can lock the operation state such that it is temporarily impossible to operate the measurement device.

By performing a locking operation on the measurement device, the user can prevent the measurement device from being operated by other people when the user is temporarily away from the measurement device, or prevent an erroneous operation such as an operation of erroneously stopping measurement in the middle of the measurement.

FIG. 11 is a flow chart illustrating the flow of a key operation execution process of the measurement device of the related art shown in FIG. 8.

For example, if the user operates any one key of the operation unit 106 in order to issue an instruction to the measurement device (STEP S1), in STEP S2, the CPU 107 determines whether the current state of the measurement device is the unlocked state or the lock state.

If it is determined in STEP S2 that the current state is the unlocked state, the CPU transitions to STEP S3 in which the CPU executes a predetermined process assigned to the operated key. Meanwhile, if it is determined that the current state is the lock state, in STEP S4, the CPU determines whether the input key operation is an unlocking operation.

If it is determined in STEP S4 that the input key operation is an unlocking operation, the CPU proceeds to STEP S3 in which the CPU executes a predetermined unlocking key process. Meanwhile, if it is determined that the input key operation is not an unlocking operation, in STEP S5, the CPU finishes the process flow without executing a key process.

The user can switch the measurement device to the lock state by the key operation execution process. In this way, the user can lock the operation state of the measurement device such that every operation except for an unlocking operation is temporarily impossible.

In Japanese Patent Application Laid-Open JPH07-067497A, there is disclosed a technology related to a key lock function of locking various keys of the operation panel to keep functions selected by keys, operation conditions set by keys, and the like such that even through various keys are operated, signal inputs based on the operated keys are canceled.

Patent Document 1: Japanese Patent Application Laid-Open JPH07-067497A,

However, in the lock function of the related art, since every operation except for an unlocking operation is impossible in the lock state, the following inconvenient situations occur.

For example, it can be considered a case where the user performs measurement at an arbitrary timing in a state where the settings of measurement conditions of the measurement device are fixed. In this case, the user wants to lock operation keys for setting measurement conditions such that it is impossible to change the measurement conditions by user's erroneous operations while keeping operation keys for measurement in the unlocked state such that a measuring operation is possible.

Also, in a measurement device which needs a plurality of configuration parameters, the user may want to lock operation keys for setting such that it is possible to change some desired parameters but it is impossible to change the other parameters.

However, in case of the lock function of the related art, since every operation except for an unlocking operation is impossible in the lock state, even through the user wants to perform some operations in the lock state, those operations are not processable.

Since the user can select only whether to lock every operation key or permit every operation, it is inconvenient to use the lock function of the related art.

SUMMARY

Exemplary embodiments of the invention provides an electronic device including an operation unit and having an easily usable lock function of selectively permitting a user to perform desired operations even when the operation unit is locked, without locking every operation key of the operation unit without exception.

An electronic device according to an exemplary embodiment, comprises:
a display unit; and
an operation unit, wherein:
the electronic device has a lock function of locking operation functions on the operation unit such that the operation functions are temporarily inoperable, and
at least one of the operation functions is set to be selectively operable even in a lock state.

The at least one of the operation functions selectively operable even in the lock state may be designated in advance before locking.

The display unit may have a display screen on which a plurality of software keys is displayed, and
the operation unit may include
a plurality of operation keys corresponding to the plurality of software keys;
a plurality of function keys to which processing functions have been assigned in advance, and
a lock control key which receives an input for setting the lock function or releasing the setting of the lock function.

The electronic device may be a measurement device configured to measure a physical quantity which is an object to be measured and display a measurement result of the physical quantity.

According to the above described configurations, it is possible to implement an electronic device having an easily usable lock function of selectively permitting a user to perform desired operations even when an operation unit is locked.

DETAILED DESCRIPTION

Figure 1:
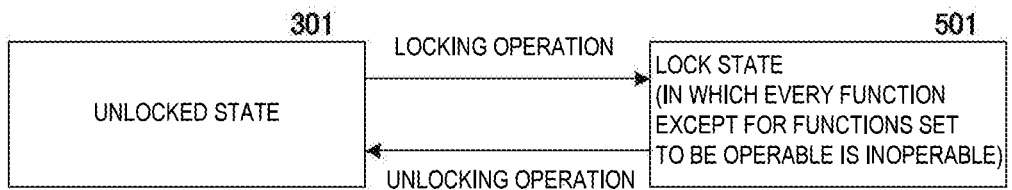
FIG. 1 is a state transition view of a measurement device of an embodiment based on the present invention.

Hereinafter, an embodiment of the present invention will be described in detail with reference to the accompanying drawings. FIG. 1 is a state transition view of a measurement device of an embodiment based on the present invention, and shows an unlocked state 301 in which it is possible to operate the measurement device, and a lock state 501 in which it is impossible to operate the measurement device.

Figure 10:
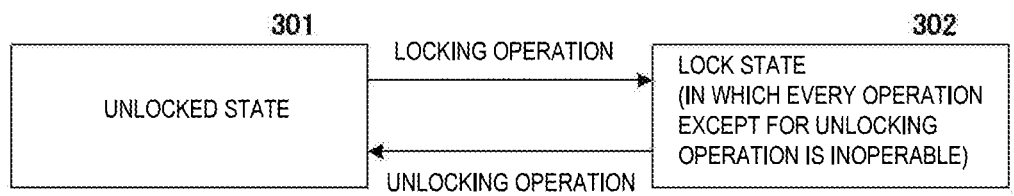
FIG. 10 is a state transition view of the measurement device of the related art which is configured as shown in FIGS. 8 and 9 and has a lock function.
Figure 11:
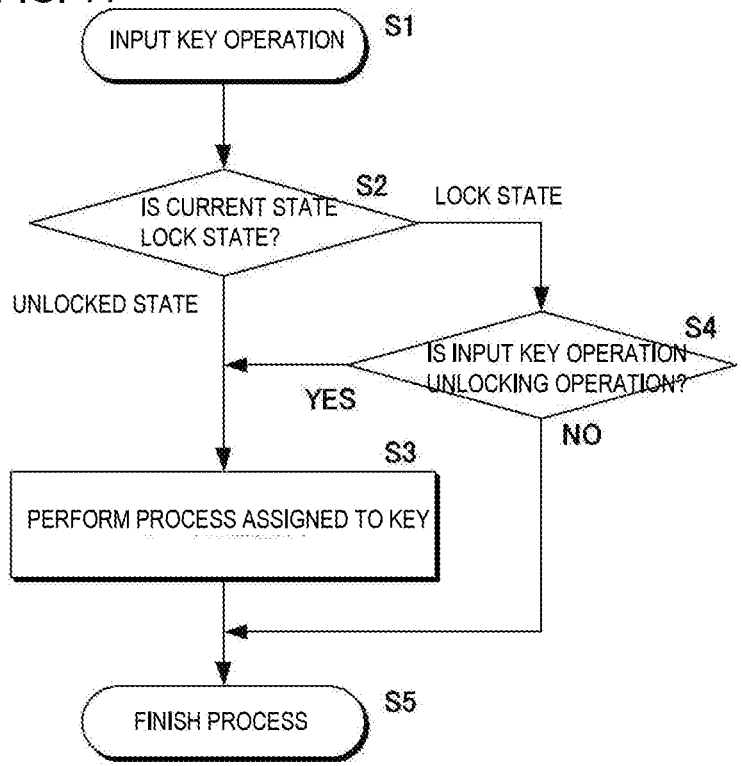
FIG. 11 is a flow chart illustrating the flow of a key operation execution process of the measurement device of the related art shown in FIG. 8.

The unlocked state 301 represents a pre-locking state in which the measurement device is unlocked and allows the user to operate the measurement device through the input device, similarly to the unlocked state 301 of the related art shown in FIG. 10. In the unlocked state 301, it is possible to perform various operations, such as operations of setting measurement conditions, operations for performing or interrupting a measuring operation, and an operation for performing an analyzing process on measurement results.

The lock state 501 shown in FIG. 1 is different from the lock state 302 of the related art shown in FIG. 10. In the lock state 302 of the related art, it is impossible to perform every operation except for an unlocking operation. In contrast, in the lock state 501 of the present invention, it is possible to operate functions set to be operable, in addition to an unlocking operation, but it is impossible to perform the other operations similarly in the lock state 302 of the related art.

A function operable even in the lock state 501 is designated as an operation which the user wants to perform in the lock state, in advance, by operating an operation unit 106 while watching a display unit 108 when the measurement device is in the unlocked state 301. For example, the user may specially designate any one of functions of the measurement device, as a function operable even in the lock state, and set the corresponding function as an option of the measurement device, or a specific function of the measurement device may be determined as a default state. In either case, before locking, a function operable even in the lock state is designated in advance.

Figure 2:
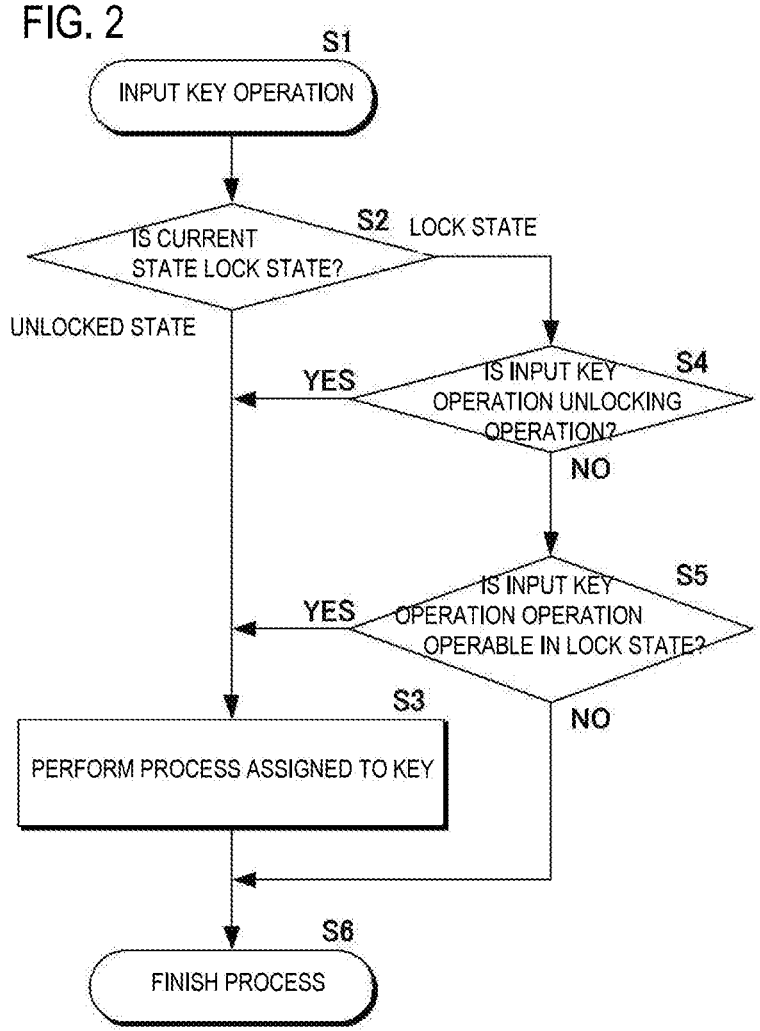
FIG. 2 is a flow chart illustrating the flow of a key operation execution process of the measurement device of the embodiment based on the present invention.

FIG. 2 is a flow chart illustrating the flow of a key operation execution process of the measurement device based on the present invention.

For example, if the user operates any one key of the operation unit 106 in order to issue an instruction to the measurement device (STEP S1), in STEP S2, the CPU 107 determines whether the current state of the measurement device is the unlocked state or the lock state.

If it is determined in STEP S2 that the current state is the unlocked state, the CPU transitions to STEP S3 in which the CPU executes a predetermined process assigned to the operated key. Meanwhile, if it is determined that the current state is the lock state, in STEP S4, the CPU determines whether the input key operation is an unlocking operation.

If it is determined in STEP S4 that the input key operation is an unlocking operation, the CPU proceeds to STEP S3 in which the CPU executes a predetermined unlocking key process. Meanwhile, if it is determined that the input key operation is not an unlocking operation, in STEP S5, the CPU determines whether the input key operation is an operation executable even in the lock state.

If it is determined in STEP S5 that the input key operation is an operation executable in the lock state, the CPU proceeds to STEP S3 in which the CPU performs the predetermined key process assigned to the operated key. Meanwhile, if it is determined that the input key operation is not an operation executable in the lock state, in STEP S6, the CPU finishes the process flow without performing the predetermined key process assigned to the operated key.

Even though the measurement device based on the present invention is switched to the lock state 501 by performing the key operation execution process described above, not every operation key is locked, and operations which the user has selected, designated, and set so as to be possible even in the lock state are possible.

Figure 3:
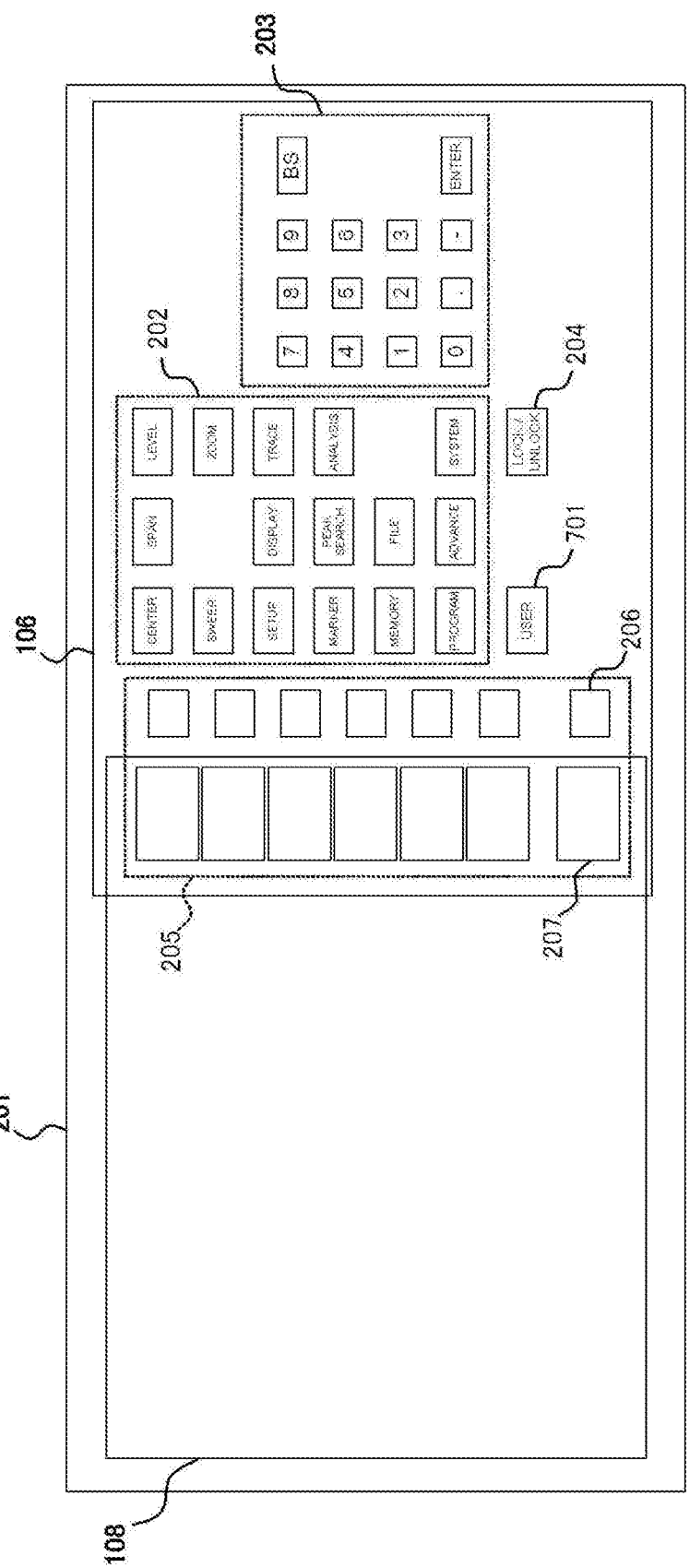
FIG. 3 is a view illustrating an example of the configuration of a front panel of a light spectrum measurement device which is configured on the basis of the present invention.
Figure 9:
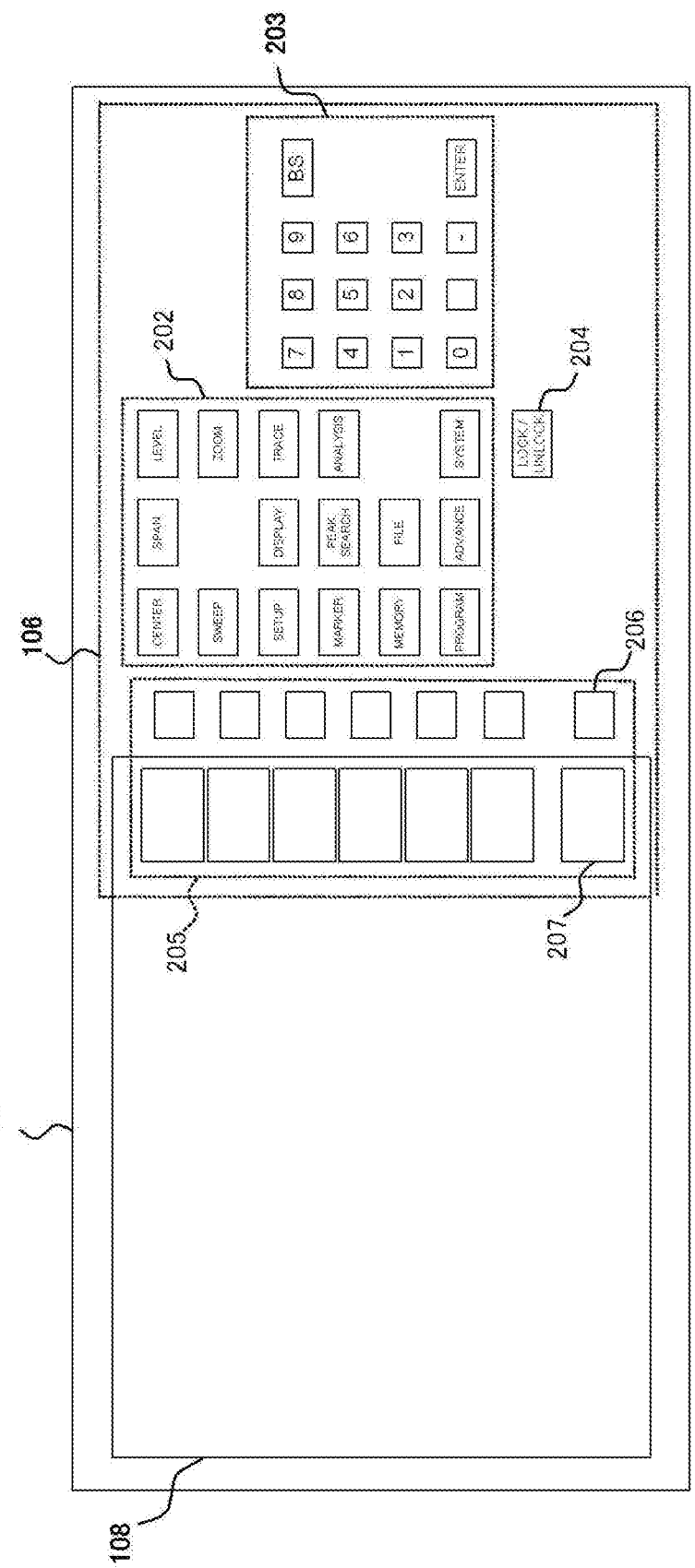
FIG. 9 is a view illustrating an example of the configuration of a front panel of the light spectrum measurement device which is configured as shown in FIG. 8.

FIG. 3 is a view illustrating an example of the configuration of a front panel of a light spectrum measurement device which is configured on the basis of the present invention. In FIG. 3, parts identical to those of FIG. 9 are denoted by the same reference symbols.

A front panel 201 shown in FIG. 3 has a user key 701. The user can assign one or more functions operable even in the lock state 501, to software keys 207, and register the corresponding software keys in the user key 701, in advance.

In other words, the user key 701 is a key for calling the software keys assigned in advance by the user. If the user presses the user key 701, the software keys 207 assigned in advance by the user are displayed in the software key part 205 of the display unit 108, and if the user presses a key 206 corresponding to a software key 207 to which a desired function has been assigned, the desired function is executed.

Figure 4:
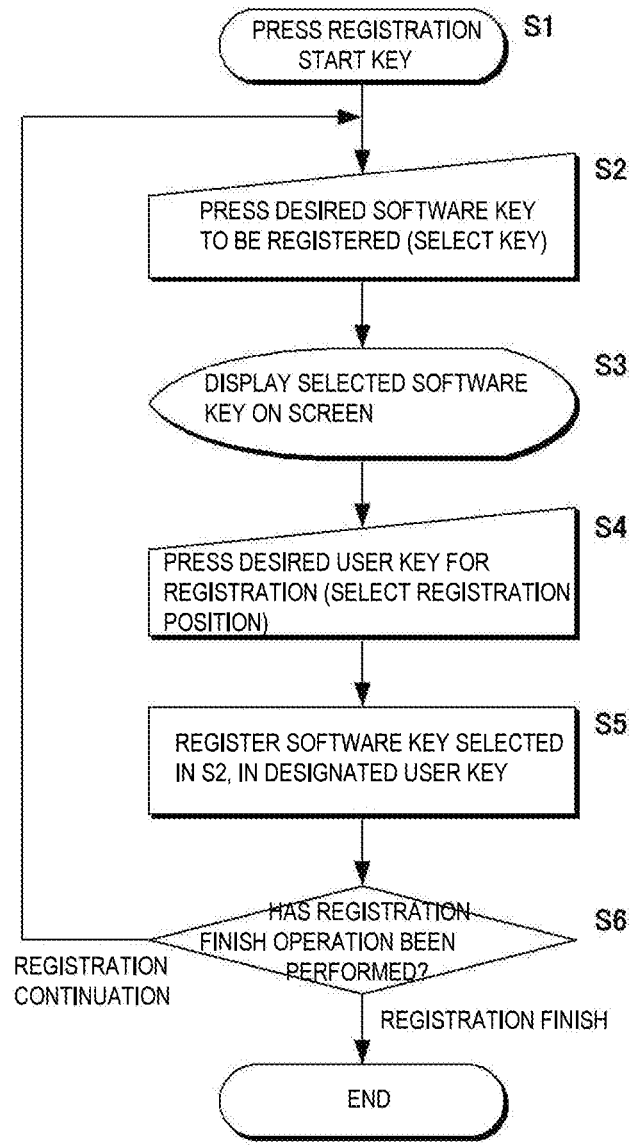
FIG. 4 is a flow chart for explaining the flow of a process of registering software keys 207 to which desired functions have been assigned, in a user key 701.

FIG. 4 is a flow chart for explaining the flow of a process of registering software keys 207 to which desired functions have been assigned, in the user key 701.

If the user presses a registration start key included in the operation unit 106, registering of software keys 207 in the user key 701 starts (STEP S1).

In order to select a desired key to be registered, the user presses a function key 202 and a software key 207 corresponding to the desired key to be registered (STEP S2). The selected software key 207 is displayed on the display unit 108 (STEP S3).

The user designates the position of any one of software keys 207 which have been displayed by pressing the user key 701 and in which the key selected in STEP S2 by pressing the software key 207 will be registered (STEP S4). In the position of the software key 207 designated in STEP S4 by the user, the key selected in STEP S2 is registered (STEP S5).

In a case of wanting to keep registering, the user returns to STEP S2. Meanwhile, in a case of wanting to finish registering, the user performs a registration finish operation, thereby finishing registering (STEP S6).

By the above described process, the user can register one or more software keys 207 to which desired functions have been assigned, in the user key 701, in advance.

As a result, the user can perform specific operations registered in the user key 701, even in the lock state.

Figure 5:
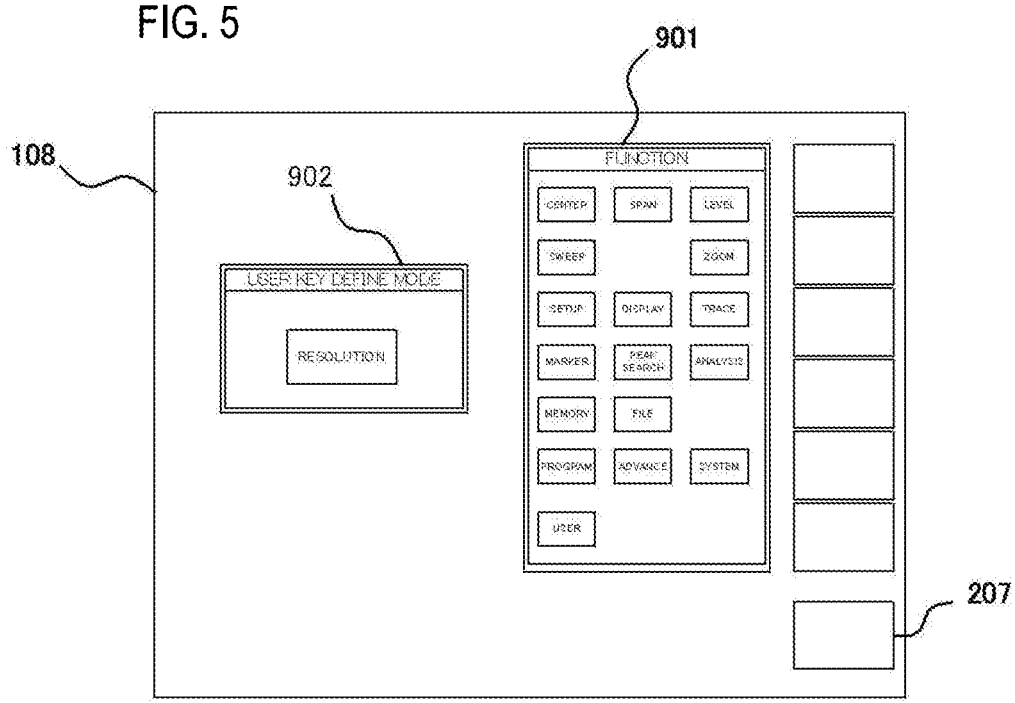
FIG. 5 is an explanatory view of an application of the process of registering software keys 207 to which desired functions have been assigned, in the user key 701.

FIG. 5 is an explanatory view of an application of the process of registering software keys 207 to which desired functions have been assigned, in the user key 701.

In order to register a software key 207 to which a desired function has been assigned, in the user key 701, in the description of FIG. 4, the user presses a function key 202 and a software key 207 corresponding to the desired key to be registered. However, in this case, instead of selecting the function key 202, a function key image 901 may be displayed on the display unit 108 as shown in FIG. 5, and the user may designate a desired key on that image.

If the user designates a function key corresponding to the desired function to be registered in the user key, on the function key image 901, one or more keys corresponding to the designated function key is displayed in a corresponding area of the software key 207.

The user designates the desired software key to be registered in the user key, by a key 206, a mouse cursor on the display unit 108, or the like. The name of the designated software key is displayed in a user key registration window 902 displayed on the display unit 108. The user can exactly understand the software key which is the current registration object, on the basis of the display of the user key registration window 902.

Subsequently, the user presses the user key 701 or selects the user key on the function key image 901 by a mouse cursor or the like. On the software key 207, one or more registered user key is displayed.

Subsequently, the user designates the position of any one of software keys 207 of the user key where the software key displayed as the current registration object in the user key registration window 902 will be registered, as a registration position by pressing a key 206 or a software key 207 corresponding to the registration position.

If the user designates the registration position, the CPU 107 stores information representing that the software key which is the current registration object is registered in the designated user key, in the storage unit 105, whereby the software key is registered as a user key.

In a case of performing a function registered in the user key, the user presses the user key 701 when user key registration is not being performed. In the software key 207 area of the display unit 108, one or more software keys corresponding to information on software keys and the user key stored in the storage unit 105 is displayed.

As a result, the user can select a software key to which a desired function has been assigned, from the displayed software keys, thereby performing the desired function.

Also, in the embodiment of FIG. 3, an example of the measurement device in which the user key 701 is provided on the front panel 201 has been described. However, as shown in FIGS. 6 and 7, it is possible to set a software key which is operable even in a case where any user key is not provided on the front panel 201, that is, even in the lock state, without using any user key.

Figure 6:
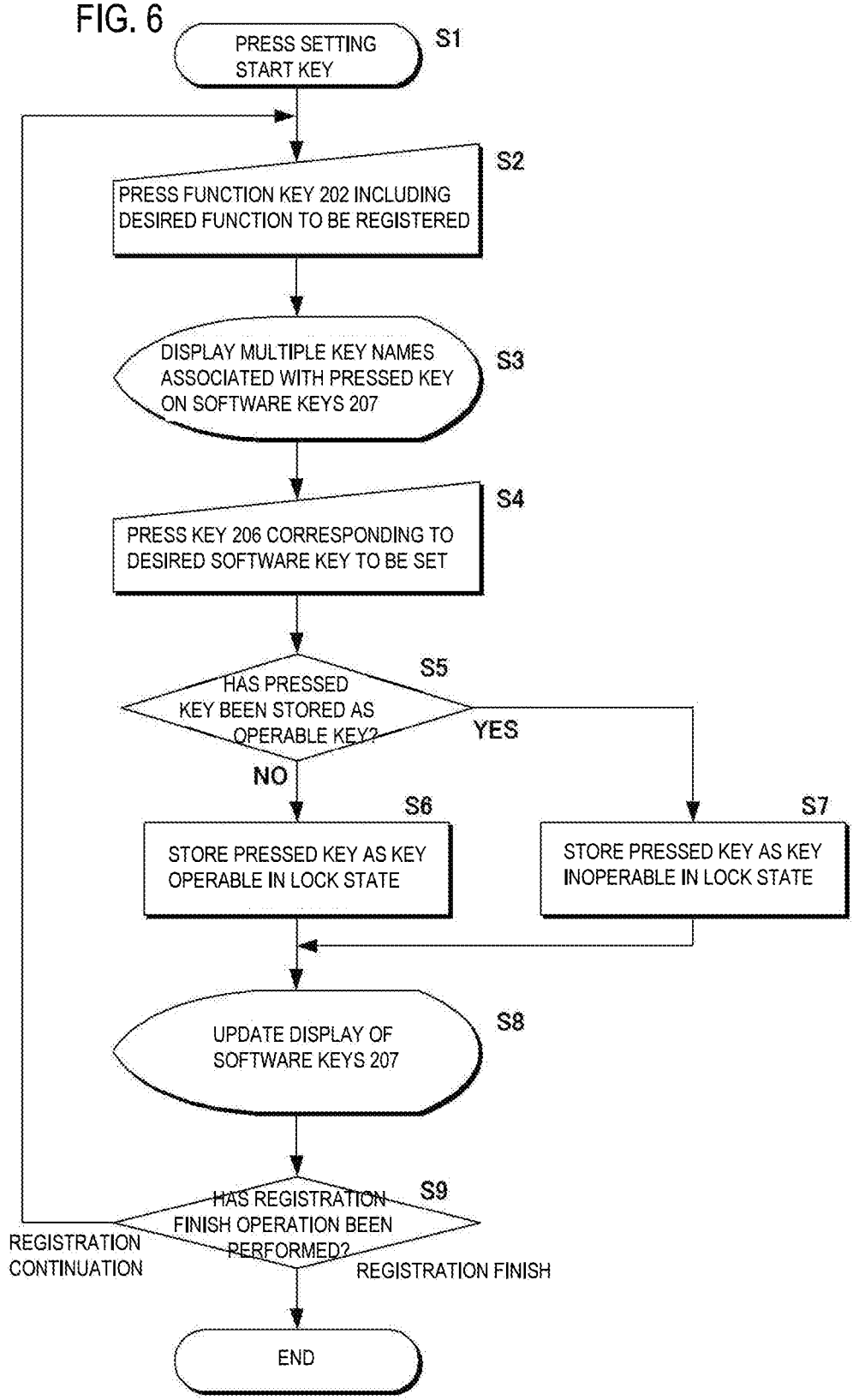
FIG. 6 is a flow chart for explaining the flow of a process of registering software keys operable even in a lock state without using the user key.
Figure 7:
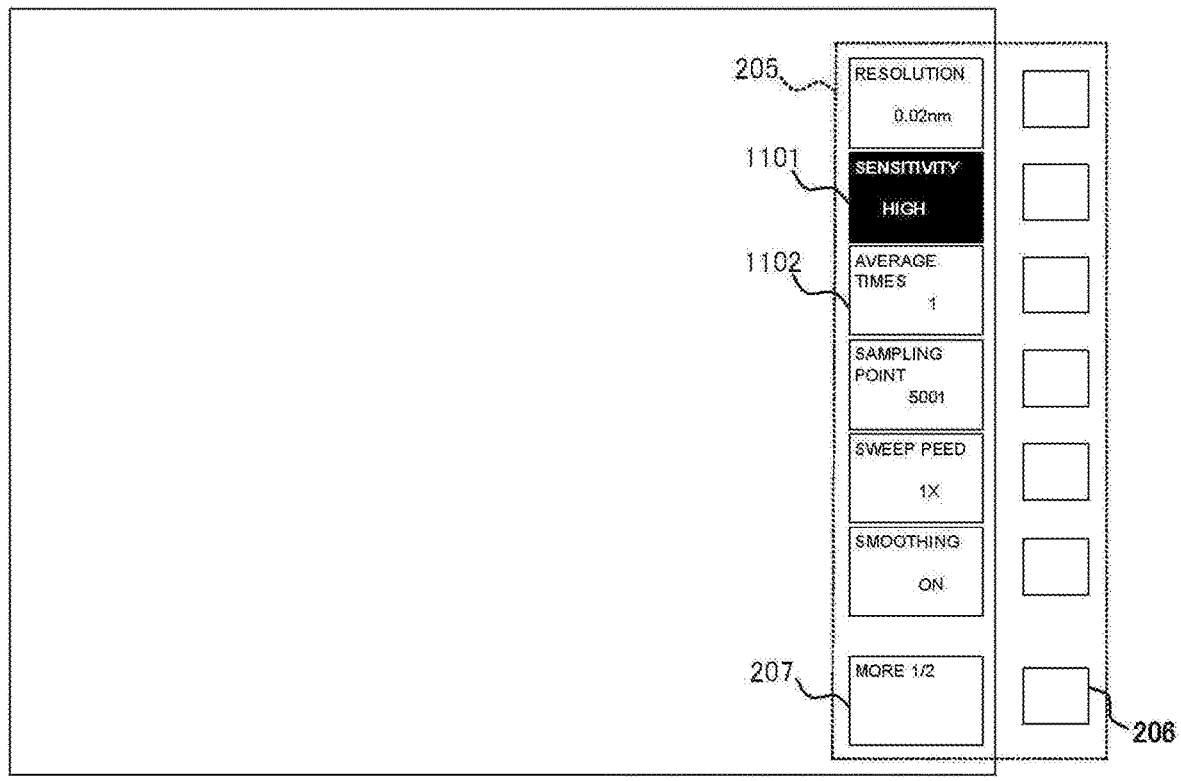
FIG. 7 is a display screen example of the measurement device when an operation is being performed in the lock state.
Figure 8:
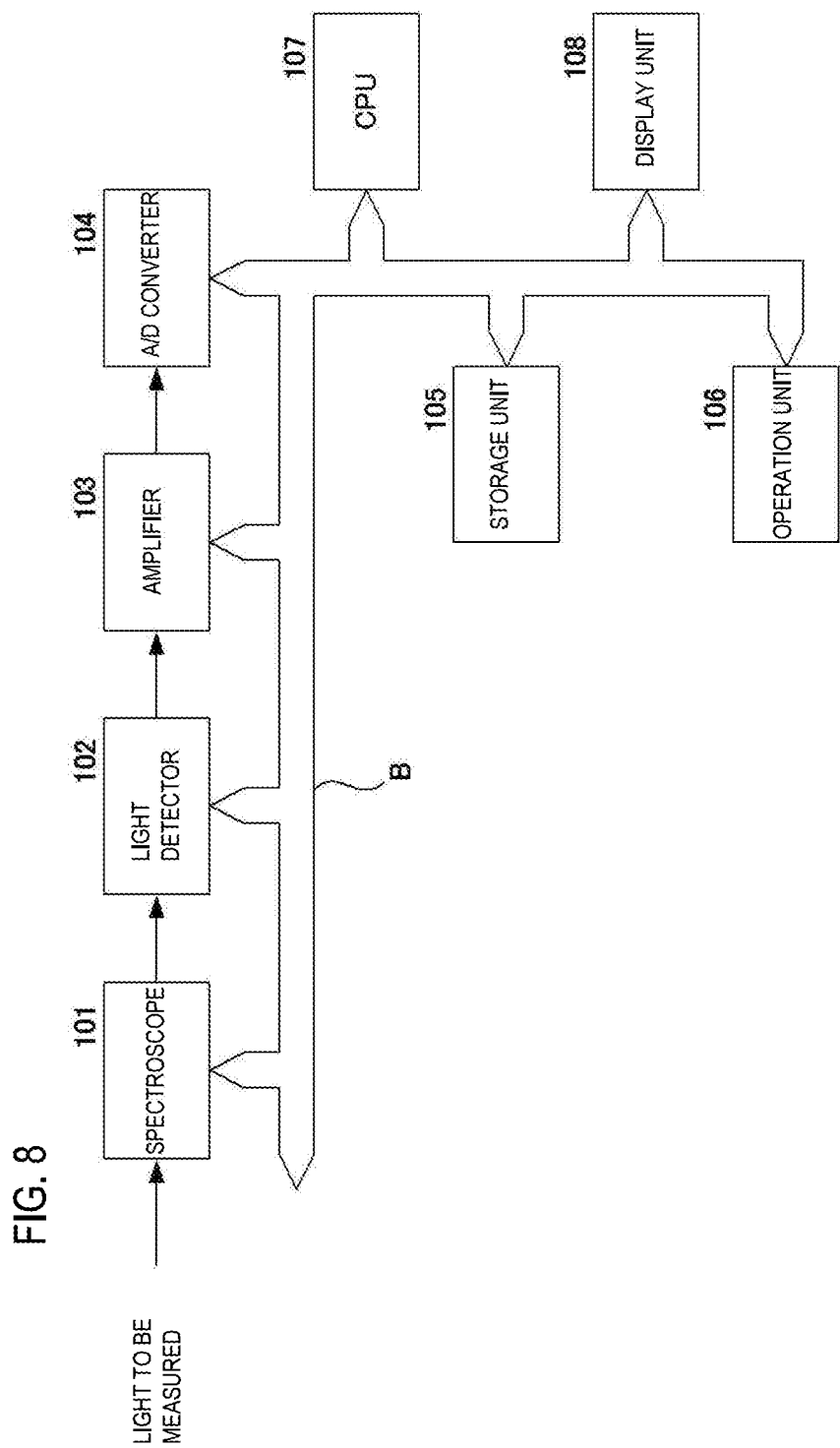
FIG. 8 is a configuration block diagram illustrating an example of a light spectrum measurement device of the related art.

FIG. 6 is a flow chart for explaining the flow of a process of registering software keys which are operable even in the lock state, without using any user key.

When designating a function which operable in the lock state 501 shown in FIG. 1, the user presses a setting start key included in the operation unit 106, whereby the measurement device enters a setting mode (STEP S1). Subsequently, in order to select a desired key to be set as an operable key, the user presses a function key 202 including a desired function to be set (STEP S2).

Then, the names of a plurality of keys associated with the pressed key are displayed on software keys 207 (STEP S3). Here, with respect to each of keys corresponding to individual functions of the measurement device, the storage unit 105 has information stored when starting to use the measurement device and representing whether the corresponding key is operable in the lock state 501.

When displaying the software keys 207, the CPU 107 determines whether each key has been set to be operable in the lock state 501, with reference to information stored in the storage unit 105 and representing whether the corresponding key is operable in the lock state, and displays the determination results such that the user can recognize the determination results.

For example, the CPU displays keys set to be operable, by white letters on a black background, and displays keys set to be inoperable, by black letters on a white background, such that the user can distinguish them. As another display example, the CPU may surround each key set to be operable, with a frame border, for example, in red.

The user presses a key 206 corresponding to a desired software key in order to change information on whether the corresponding key is operable in the lock state (STEP S4).

The CPU 107 determines whether the key pressed in STEP S4 has been already set as an operable key, on the basis of information acquired from the storage unit 105 and representing whether the pressed key is operable in the lock state (STEP S5).

In a case where the pressed key has not been stored as an operable key, the CPU sets the corresponding key as a key operable in the lock state, and stores information representing that the corresponding has been set as an operable key, in the storage unit 105 (STEP S6). Meanwhile, in a case where the pressed key has been stored as an operable key, the CPU sets the corresponding key as a key inoperable in the lock state, and stores information representing that the corresponding key has been set as an inoperable key, in the storage unit 105 (STEP S7).

Subsequently, in order to show the setting states of the keys to the user, the display of the software keys 207 is updated (STEP S8).

By the above described process, it is possible to set the key designated in STEP S4, as a key operable or a key inoperable in the lock state.

In a case where the user wants to keep on setting, the user returns to STEP S2; whereas in a case where the user wants to finish setting, the user performs a setting finish operation, thereby finishing setting (STEP S9).

By the above described process, the user can designate keys which are operable in the lock state 501, before locking.

FIG. 7 is a display screen example of the measurement device when an operation is being performed in the lock state after operable keys have been set.

If the user presses a function key 202 in order to operate the measurement device, a plurality of keys associated with the function key 202 is displayed on the software key part 205 of the display unit 108.

In this case, if the measurement device is in the lock state 501, and the user has set keys which are operable even in the lock state in advance, the function key 202 includes operable keys and inoperable keys together.

Therefore, in order to make it possible for the user to distinguish the operable keys and the inoperable keys, the operable keys are displayed, for example, by white letters on a black background, like a software key 1101, and the inoperable keys are displayed, for example, by black letters on a white background, like a software key 1102.

For example, in a case where the user has set the "SENSITIVITY" key usable to set the measurement sensitivity of the measurement device, as a key operable even in the lock state 501, and has set the "AVERAGE" key usable to set the number of times of averaging of average measurement, as a key inoperable in the lock state, as shown in FIG. 7, the measurement device displays the "SENSITIVITY" key by white letters on a black background, thereby showing that the "SENSITIVITY" key is an operable key, and displays the "AVERAGE" key by black letters on a white background, thereby showing that the "AVERAGE" key is an inoperable key.

In the embodiment of FIG. 7, operable keys and inoperable keys are displayed such that it is possible to distinguish them by the background colors of the keys, like the software key 1101 and the software key 1102. However, the present invention is not limited to that method. Operable keys may be surrounded with red frame borders, or only operable keys may be displayed without displaying inoperable keys.

Since the screen as shown in FIG. 7 is displayed when an operation is being performed, the user can clearly distinguish operable keys and inoperable keys in the lock state 501, and can press an operable key, thereby performing a desired processing function.

Here, similarly to various parameters and the like, the information set by the operation of setting keys operable in the lock state (the information on whether each key is operable in the lock state) is stored in the storage unit 105, and is retained even after the power is cut off.

Therefore, it is unnecessary to reset keys operable in the lock state whenever each of the subsequent measurements starts.

Further, in a case where it is possible to cut the power off while keeping the lock state when the measurement device is in the lock state, the state (the lock state) during power-off is held, and during the next power-on, it is possible to boot the measurement device while keeping the state (the lock state) during power-off.

Therefore, even though the power is cut off and then is turned on, the lock state is not released and it is possible to maintain the lock state.

Also, in the above described embodiment, an example in which the electronic device is the measurement device has been described. However, the present invention is not limited to the measurement device, and can also be applied to various electronic devices each of which includes a display unit and an operation unit and has a lock function of locking a function of operating the operation unit such that it is temporarily impossible to operate the operation unit.

As described above, according to the present invention, it is possible to implement an electronic device including an operation unit and having an easily usable lock function of selectively permitting a user to perform desired operations even when the operation unit is locked, without locking every operation key of the operation unit without exception.

What is claimed is:

1. A measurement device comprising:
   a display;
   a detector that detects a physical quantity and outputs measurement data based on the detected physical quantity; and
   an operation unit comprising a plurality of keys for performing operation functions for operating the measurement device to detect and output the measurement data; and a central processing unit (CPU) configured to control the display to display the measurement data on the display, and to lock the operation unit such that all of the operation functions are temporarily inoperable except for an unlocking function and at least one of the plurality of keys associated with an operation function that is set to be selectively operable even when the operation unit is locked, wherein, when the CPU initially locks the operation unit, the CPU is configured to control the display to initially display the at least one of the plurality of keys associated with the operation function that is set to be selectively operable, in a manner that is distinguishable from keys associated with an operation function that is set to be inoperable.

2. The measurement device according to claim 1, wherein:

the at least one of the plurality of keys associated with the operation function is registered in advance before the operation unit is locked.

3. The measurement device according to claim 1, wherein:

the display has a display screen on which a plurality of software keys are displayed, and the plurality of keys comprise:
- a plurality of operation keys corresponding to the plurality of software keys;
- a plurality of function keys to which processing functions have been assigned in advance, and
- a lock control key which receives an input for locking the operation unit or for releasing the locking of the operation unit.

4. The measurement device according to claim 1, wherein the CPU locks the operation unit in response to an actuation of one of the plurality of keys on the operation unit.

5. The measurement device according to claim 1, wherein at least a portion of the plurality of keys are software keys displayed on the display.

6. The measurement device according to claim 1, wherein the plurality of keys comprise a plurality of software keys displayed on the display and a plurality of function keys, and wherein prior to locking the operation unit, to set the at least one of the operation functions to be selectively operable, the CPU is configured to:

receive an actuation of a registration start key;

receive an actuation of one of the plurality of function keys and one of the plurality of software keys corresponding to the actuated function key;

receive a designation of a position of the actuated software key on the display and an actuation of a user key; and receiving a registration finish operation, wherein the one of the plurality of software keys is registered to the user key, and wherein one of the software keys registered to the user key is set as the at least one of the operation functions to be selectively operable.

7. The measurement device according to claim 1, wherein the plurality of keys comprise a plurality of software keys displayed on the display and a plurality of function keys, wherein prior to locking the operation unit, to set the at least one of the operation functions to be selectively operable, the CPU is configured to:

receive an actuation of a setting start key;

receive an actuation of a function key of the plurality of function keys;

display software keys associated with the actuated function key on the display;

receive an actuation of a desired software key to be set;

set the actuated software key to be operable when the operation unit is locked or inoperable when the operation unit is locked; and update the displayed software keys to display the actuated software key according to the operable or inoperable setting by changing the display mode of the software key.

* * * * *